United States Patent [19]

Crawford

[11] 3,904,249

[45] Sept. 9, 1975

[54] REMOTE CONTROL BRAKING APPARATUS INCLUDING JERK CONTROL

[75] Inventor: Kenneth Desmond Eddington Crawford, London, England

[73] Assignee: Westinghouse Brake and Signal Co., London, England

[22] Filed: Mar. 6, 1972

[21] Appl. No.: 231,923

[30] Foreign Application Priority Data

Mar. 23, 1971 United Kingdom ................ 7552/71

[52] U.S. Cl. .................... 303/20; 246/187 A; 303/3

[51] Int. Cl. .............................................. B60t 7/10

[58] Field of Search .................... 105/61; 235/146.2; 246/182 B, 182 C, 187 B, 187 R, 187 A; 303/20, 3; 328/133, 155

[56] References Cited

UNITED STATES PATENTS

| | | | |
|---|---|---|---|
| 3,160,821 | 12/1964 | Farrow | 328/133 X |
| 3,380,399 | 4/1968 | Southard et al. | 303/20 X |
| 3,432,210 | 3/1969 | Crouch | 303/20 X |
| 3,547,499 | 12/1970 | Maskery | 303/20 X |
| 3,685,868 | 8/1972 | Nagase et al. | 303/20 X |

*Primary Examiner*—Trygve M. Blix
*Assistant Examiner*—Stephen G. Kunin
*Attorney, Agent, or Firm*—Larson, Taylor and Hinds

[57] ABSTRACT

A remote control apparatus is proposed for railway brakes which are operated in response to binary coded signals on a group of train wires. Contactless devices are arranged to produce the binary coded signals in response to a mechanically settable device and a jerk control feature is provided by which the binary code applied to the train wires is generated by a counter which steps at a clock pulse rate upward or downward to produce parity between the train wire code and that produced by the contactless devices.

6 Claims, 2 Drawing Figures

REMOTE CONTROL BRAKING APPARATUS INCLUDING JERK CONTROL

Figure 1:
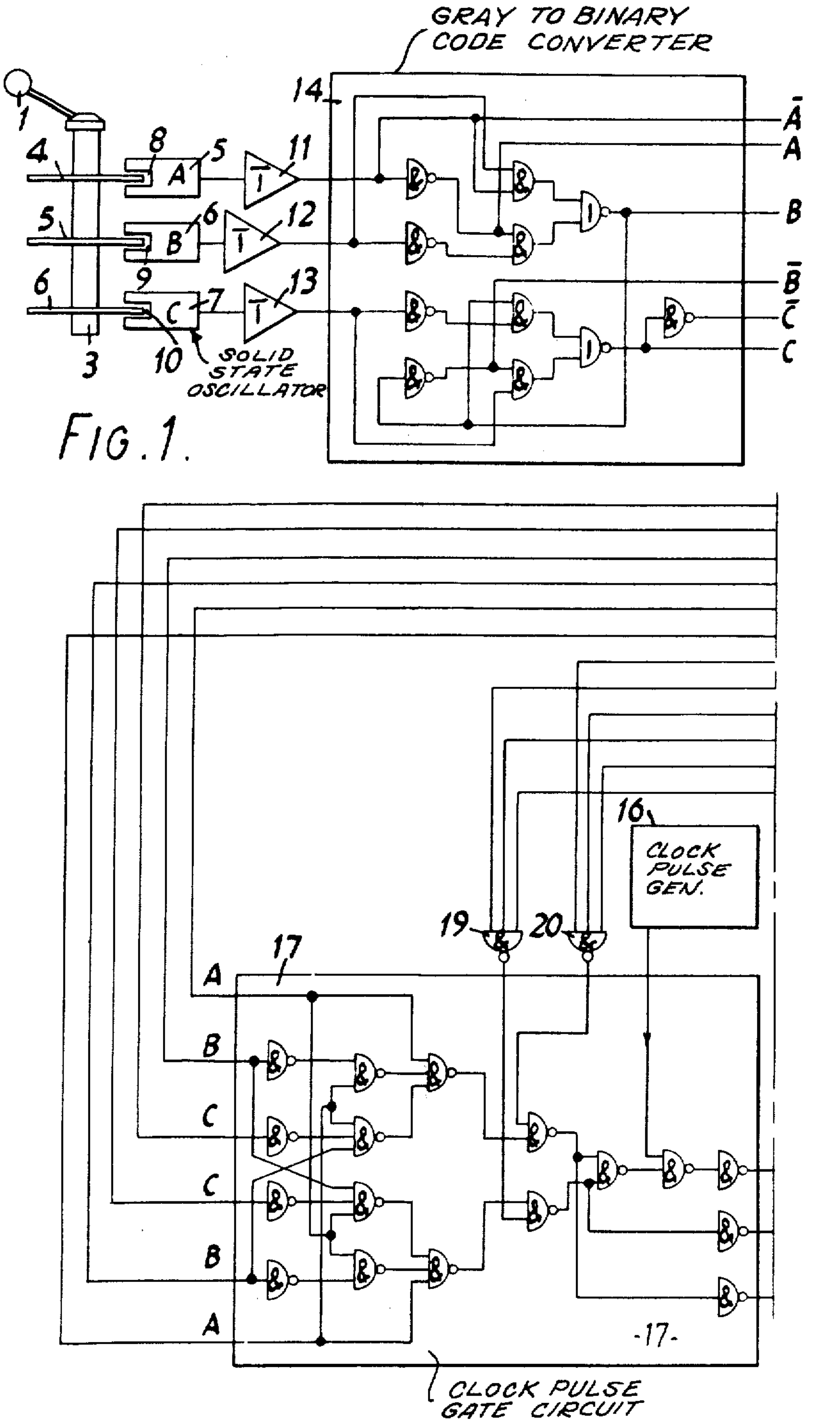

This invention relates to remote control braking arrangements and relates in particular to a remote control apparatus by which a digital braking control code is transmissable in one location to another.

In the Specification of British Patent No. 971,326 there is described and claimed a remote control arrangement comprising means for producing an output signal having a progressively variable force step characteristic by the application to said means of an input signal the character of which is variable by the selective electrical energisation of a combination of a plurality of leads, each combination of leads so energised being unique to a step in the progressive variation of the character of the output signal and further comprising electrical switching means whereby any required combination of leads can be energised, said switching means being operable stepwise one switching operation corresponding to one step in the progressive variation of the character of the output signal such that in progressing from one step in the operation of said switching means to the next successive step, only a single additional lead is energised or a single lead already energised is de-energised to achieve the combination of energised leads characteristic of the step in the progressive variation of the output signal corresponding to said next successive step in the operation of the switching means.

More specifically, the Specification of the above Patent describes a railway vehicle braking apparatus including a drivers' brake control device which is arranged to energise or de-energise each of three electrical leads according to each of eight positions to which the control device is moved. The said electrical leads are connected to respective ones of energising windings of electro-magnetically operable contactors housed in a contactor unit, the contacts of these contactors being included in an electrical circuit through which current is supplied to remotely disposed energising windings of electro-magnetically operable valves which are coupled to a suitable pneumatic force actuator responsive to the digital coded combination of energisation of the valves to provide a braking fluid pressure.

It will thus be seen that it is possible by the three leads to simultaneously control braking on all cars of a train.

The details of the precise arrangement of the above Patent are of no consequence to the present invention but the above general statement serves to provide a background against which the invention may be considered. Thus it can be seen to be a particular requirement of such a system that a suitable form of switching means shall be provided to enable the selective electrical energisation of the leads. Also it will have been observed that this has hitherto been achieved by suitable electro-magnetic contactors.

According to the invention there is provided a remote vehicle brake control apparatus including a brake control device having control means which is settable to a range of conditions according to the desired braking effect said means being linked to a plurality of contactless signal couplers which according to the selected position of said means are thereby selectively rendered effective or ineffective to couple electrical signals to descrete combinations of a plurality of signal channels in accordance with a code by which the signal in only one said channel occurs at each transition during progressive stepping of the control means in one direction or the other to increase or reduce the braking and a plurality of output leads for providing a binary coded output for controlling the brakes of a vehicle.

The invention further provides a remote vehicle brake control apparatus which includes means for establishing binary coded combinations of electrical signals in a plurality of electrical conductors for connection to binary signal control braking means the apparatus including jerk control means between said conductors and the binary signal coded braking means for preventing an excessive rate of increase of braking effect, the jerk control means comprising a pulse generator, a counter and a binary comparator, the comparator being operable to compare the binary output of the binary counter with the binary coded combination of electrical signals on the electrical conductors and in response to non-conformity there between to gate pulses from the generator to set the counter in a sense to tend to produce conformity, a binary coded output for controlling the brakes being derivable from the said counter.

It will be appreciated from the following that the invention finds particular but not exclusive application in a coded braking system to ensure jerk-free operation whatever the rate at which a driver's brake handle, for example, is moved to initiate or increase a brake application.

Figure 2:
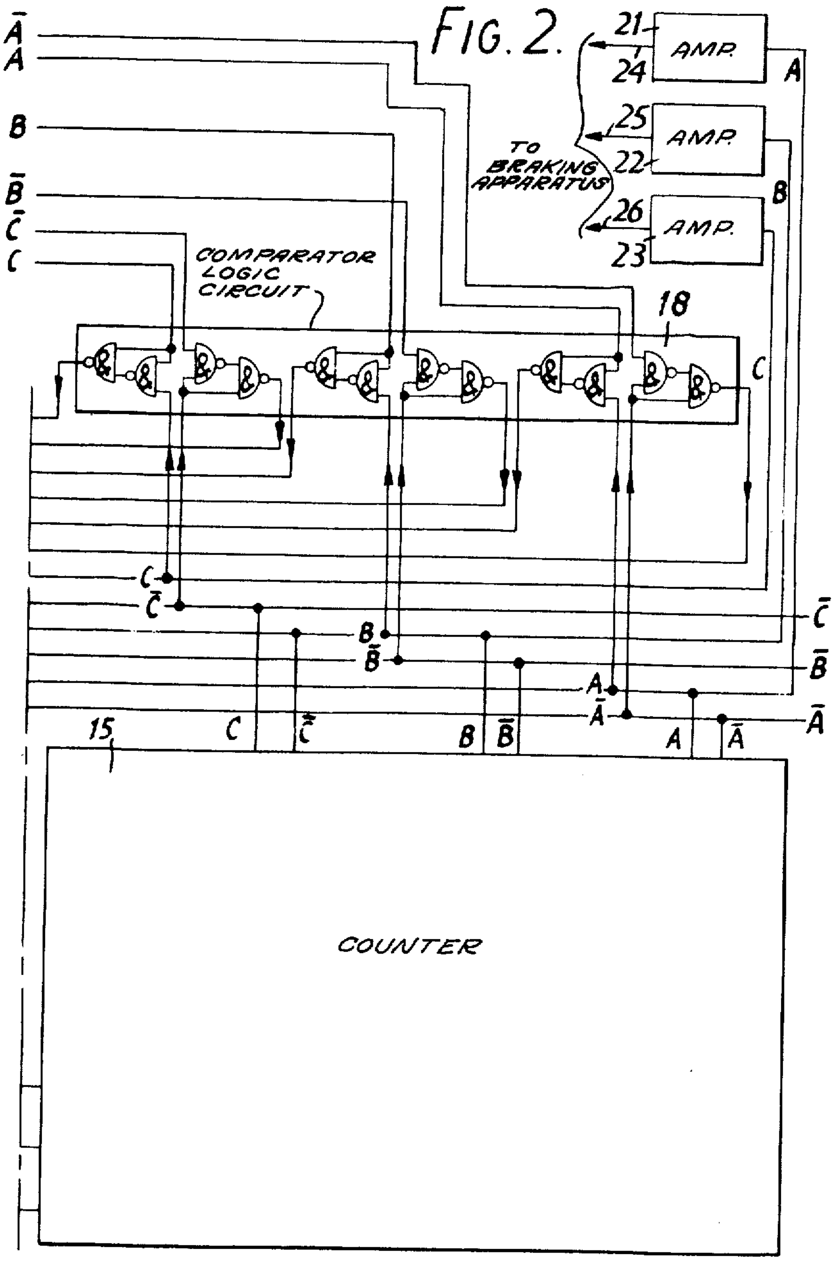

In order that the invention may be more clearly understood and readily carried into effect, the same will be further described by way of example with reference to the accompanying drawings which:

FIGS. 1 and 2 of which placed together illustrate in diagrammatical form a brake control apparatus embodying the invention.

Braking pressure control valve apparatus is commercially available which operates on the principles illustrated in the above-mentioned British Patent Specification No. 971,326. Thus at each vehicle of a train, at least one control valve device is normally provided which is responsive to a binary coded representation in the form of electrical energisation of three wires, to produce a brake cylinder pressure at one of seven step levels.

By the apparatus to be described the three wires may be energised without the provision of contact devices associated with a driver's brake handle.

It will be appreciated also that in the absence of suitable delays being built in to the pneumatic part of the braking system which the apparatus controls, it would be possible for rapid changes to take place in the binary code transmitted over the three wires to the various braking control valves and thereby for rapid changes of braking pressure to occur such as to cause undesirable jerking, damage and passenger discomfort. The apparatus illustrated in the drawing, includes means whereby it is possible at the driver's control location, to prevent changes of the transmitted code occurring at greater than a set rate whatever the rate at which the drivers' brake handle or other control means may be operated.

Referring to the drawings, a drivers brake handle, indicated at 1, is connected to the shaft 3 which carries three metallic vanes 4, 5 and 6 which are in the form of discs with selectively removed portions. The manner in which the portions are selectively removed is arranged such that for successive ones of eight positions of the shaft 3, electrical digital code signal couplers 5, 6 and 7 are selectively rendered operative. The devices 5, 6 and 7 consist of solid state oscillators which produce oscillations in the absence of vane metal within the slots 8, 9 and 10 as shown. The outputs from the devices 5, 6 and 7 are rectified internally thereof and the direct current outputs are applied to inverting Schmitt trigger circuits 11, 12 and 13 respectively, to present sharply defined digital codes to a Gray code to binary code converter represented by the block 14. The block 14 converts the inputs derived from 11, 12 and 13 from a so-called Gray code into a binary code. The Gray code is effected by virtue of the manner in which vanes 4, 5 and 6 are cut out and which has the characteristic of changing only one digit per unit displacement of the shaft 3. As a result of the use of the Gray code, there is no possibility of a faulty code bring generated by a critical transitional position of 1 being selected.

The arrangement further includes an up-down digital counter represented by the block 15 which can count up or down in response to clock pulses derived from a clock pulse generator 16 via a clock pulse gate circuit 17. The direction in which the counter 15 operates in response to received clock pulses is determined by the presence of an "up" input or a "down" input on a line 19 and these inputs are derived from the gate circuit 17.

The gating circuit 17 is controlled by outputs derived from a comparator logic circuit represented by the block 18 which compares the digital outputs from the counter 15 with the digital outputs from the Gray code to binary code converter represented by block 14. For the purposes of operation of the logic circuits, the counter 15 and the converter 14 provide "not" outputs $\bar{A}$, $\bar{B}$ and $\bar{C}$ when the normal digital outputs A, B and C respectively are not present and in the logic shown, the digit A is the digit of highest significance and the digit C is the digit of lowest significance in the binary code notation. Such not digit outputs are used to enable correct operation of the logic circuits and a particular use thereof is made in controlling a gate 20 which has the purpose of causing circuit 17 to inhibit the application of pulses to the counter 15 when a count of 000 is reached. A similar gate 20 is provided which causes the circuit 17 to inhibit pulses to the counter at a point where a count of 111 is reached.

The logic circuits of the converter 14, the comparator 18, the gating circuit 17 and the counter 15 are all made up on printed circuit cards with commercially available integrated circuit logic components which are readily employed by the skilled engineer.

In operation of the apparatus the drivers brake handle 1 is set to a position which corresponds to a desired braking effect and this results in a corresponding combination of oscillation outputs corresponding to Gray code digits A, B and C to be produced by the oscillators 5, 6 and 7. The inverting Schmitt trigger circuits therefore are correspondingly switched and produce zero digit outputs corresponding to Gray code digit 1's. This Gray code representation is then converted into a pure binary code combination by the converter 14 to provide selective energisation of the not output lines $\bar{A}$, $\bar{B}$ and $\bar{C}$, and the binary digit outputs A, B and C thereof. The Gray code to binary conversion operates by complementing a Gray code digit when the converted corresponding preceding digit is a 1 digit. As mentioned above the most significant digit is the A digit.

The comparator 18 compares the demanded code appearing at the output of the converter 14 and the coded output which for the time being exists at the outputs of reversible binary counter 15. The logic of the comparator is such that when the demanded code is greater than the counter code output, the comparator produces a logical zero (0) on the up control line corresponding to the digit in question. When the demanded code digit is greater than the counter code digit, the comparator produces a zero (0) output on the down control line corresponding to the digit in question. The comparator output for any stage is a logical 0 on the up line or the down line as the case may be until parity between the respective digits occurs. At parity of the respective digits the "0" outputs changes to a 1 output.

The circuit 17 functions as a preference circuit such that it applies up or down signals to the counter 15 under the control of the highest significant input to the gate 17 in order that the counter 15 shall always be stepped up or down to first bring the most significant digit into agreement with the demanded code digit appearing at the output of converter 14.

Since the pulse rate of the generator 16 is present, the rate of change of code output from the binary counter is restricted by this pulse rate and is independent of the rate at which the handle may be operated. Therefore there is an effective jerk control of the coded output signals which are applied to the conductors for operating the braking apparatus. Typically, the A, B and C digit outputs from the counter 15 are applied to amplifiers such as represented by blocks 21, 22 and 23 for the purposes of amplifying the digital code signals to a suitable voltage and current level to be transmitted by the conductors to the digitally controllable braking apparatus. Whilst in the example shown, the amplifiers 21, 22 and 23 are controlled by the A, B and C outputs of the counter 15, in some applications, it may be required to control the signals to the conductors 24, 25 and 26 by the complements of their outputs. In that case, the amplifiers would be suitably designed for connection to the $\bar{A}$, $\bar{B}$ and $\bar{C}$ outputs of the counter 15.

The digitally controllable braking apparatus typically comprises apparatus such as described in the above mentioned British Patent Specification No. 971,326 and which is also the subject of British Patent Specification No. 903,600.

Means may be provided in an arrangement such as described, for ensuring that in the event of a disconformity pertaining between the outputs from the counter 15 and the outputs from the converter 14 for more than a predetermined interval of time, the amplifiers 21, 22 and 23 are connected directly to the respective output of the Gray to binary converter 14. This will ensure continued operation of the apparatus in the event of malfunctioning of say, the counter 15.

Whilst the above described apparatus is described purely for controlling braking, it may readily be applied also to traction control. The vanes 4, 5 and 6 may have a traction control range of positions and a further wire may be provided for indicating whether the shaft 3 is in its braking control range or its traction control range to transmit to remote responsive apparatus at say each car of a train controlled thereby, a "mode" control signal to effect braking or traction in response to the received binary code.

In addition, it will be appreciated that whilst the above described arrangements use a mechanical control handle and subsequent suitable means for generating the electrical signals on lines 24, 25 and 26, the jerk control features of the apparatus may be employed with suitable modifications in an automatic train operating system. In that case the drivers brake handle 1 from a functional point of view may be replaced by suitable train control signal receiving means to produce suitable signals as inputs to the converter 14.

Since, as compared with a control means such as described in the above mentioned Patent Specification No. 971,326, the apparatus described with reference to the accompanying drawing is relatively small, it is now feasible that a drivers control box may be provided in the form of a portable unit which could be personally carried by a train driver and merely be plugged in by the driver at the driving position from which the driver is required to drive a train or vehicle.

By providing for a controlled rate of change of coding on the lines 24, 25 and 26 the apparatus can afford "jerk" control which does not interfere with emergency applications or slide control facilities which may be provided for at each car of the train.

Having thus described our invention what we claim is:

1. A remote vehicle control apparatus including a brake control device having control means which is settable to a range of conditions according to the desired braking effect said means being linked to a plurality of signal couplers which according to the selected position are rendered effective or ineffective to couple electrical signals to discrete combinations of a plurality of signal channels in accordance with a code by which the signal in only one said channel occurs at each transition during progressive movement of the control means in one direction or the other to increase or reduce the braking, and a plurality of output leads for providing a binary coded output, jerk control means connected between said output leads and binary coded braking means and comprising a binary coded counter, an electrical pulse generator and a comparator circuit for comparing the said binary coded output with a binary coded output of the binary counter and in response to non-conformity there between enabling pulses to be gated from the pulse generator to the counter to reduce the non-conformity, the counter having a plurality of outputs for providing a binary coded output connected to said binary coded braking means for controlling the brakes of a vehicle.

2. A remote vehicle brake control apparatus including a brake control device having control means which is settable to a range of conditions according to the desired braking effect, said means being linked to a plurality of signal couplers which according to the selected position are rendered effective or ineffective to ouple electrical signals to discrete combinations of a plurality of output leads for providing a binary coded output, said apparatus further comprising jerk control means connected to said output leads and comprising a binary counter, an electrical pulse generator and a comparator circuit for comparing the said binary coded output with a binary coded output of the binary counter and in response to non-conformity there between enabling pulses to be gated from the pulse generator to the counter to reduce the non-conformity and the counter having a plurality of output leads for providing a binary coded output for controlling the brakes of a vehicle.

3. A remote vehicle brake control apparatus as claimed in claim 1, the signal couplers being contactless devices.

4. A remote vehicle brake control apparatus as claimed in claim 3, the signal couplers comprising oscillators controlled by metallic vane members carried by said control means to either be in an oscillating or a non-oscillating state in dependence upon the position of the respective vane members in relation thereto.

5. A remote vehicle brake control apparatus as claimed in claim 1 wherein between the signal couplers and the output leads there is provided a Gray code to binary code conversion logic circuit.

6. A remote vehicle brake control apparatus which includes means for establishing binary coded combinations of electrical signals in a plurality of electrical conductors for connection to binary signal control braking means, the apparatus including jerk control means between said conductors and the binary signal coded braking means for preventing an excessive rate of increase of braking effect, the jerk control means comprising a pulse generator, a counter and a binary comparator, the comparator being operable to compare the binary output of the binary counter with the binary coded combination of electrical signals on the electrical conductors and in response to non-conformity there between to gate pulses from the generator to set the counter in a sense to tend to produce conformity, a binary coded output for controlling the brakes being derivable from the said counter.

* * * * *